(12) United States Patent
Sugiyama et al.

(10) Patent No.: US 8,548,677 B2
(45) Date of Patent: Oct. 1, 2013

(54) DISPLAY CONTROL APPARATUS

(75) Inventors: Hitoshi Sugiyama, Anjo (JP); Shigeo Katoh, Kariya (JP); Yoshihiro Ueda, Kariya (JP)

(73) Assignee: Denso Corporation, Kariya (JP)

( * ) Notice: Subject to any disclaimer, the term of this patent is extended or adjusted under 35 U.S.C. 154(b) by 66 days.

(21) Appl. No.: 13/397,866

(22) Filed: Feb. 16, 2012

(65) Prior Publication Data

US 2012/0215404 A1 Aug. 23, 2012

(30) Foreign Application Priority Data

Feb. 21, 2011 (JP) ................................ 2011-034760
Dec. 28, 2011 (JP) ................................ 2011-288065

(51) Int. Cl.
*G06F 7/00* (2006.01)
*B60Q 1/00* (2006.01)
*G09G 5/00* (2006.01)
*G06F 5/00* (2006.01)

(52) U.S. Cl.
CPC ... *G06F 5/00* (2013.01); *B60Q 1/00* (2013.01); *G09G 5/00* (2013.01)
USPC ............................ 701/36; 340/425.5; 345/666

(58) Field of Classification Search
USPC ................. 701/36, 408, 426, 420; 340/425.5, 340/990–994; 345/581, 619–680, 1.1–3.4; 709/217–219
See application file for complete search history.

(56) References Cited

U.S. PATENT DOCUMENTS

| | | | | |
|---|---|---|---|---|
| 5,121,112 | A * | 6/1992 | Nakadozono | 340/870.16 |
| 5,757,268 | A * | 5/1998 | Toffolo et al. | 340/461 |
| 7,880,602 | B2 * | 2/2011 | Kasamatsu | 340/461 |
| 8,018,354 | B2 * | 9/2011 | Yamamoto | 340/995.11 |
| 8,370,059 | B2 * | 2/2013 | Sakai | 701/428 |
| 2008/0094421 | A1* | 4/2008 | Maeda | 345/661 |
| 2010/0117810 | A1 | 5/2010 | Hagiwara et al. | |
| 2010/0321170 | A1* | 12/2010 | Cooper et al. | 340/425.5 |

FOREIGN PATENT DOCUMENTS

| | | |
|---|---|---|
| EP | 1 321 924 | 6/2003 |
| JP | 1 321 924 | 6/2003 |
| JP | 2009-140488 | 6/2009 |

* cited by examiner

*Primary Examiner* — Thomas Tarcza
*Assistant Examiner* — Tyler J Lee
(74) *Attorney, Agent, or Firm* — Harness, Dickey & Pierce, PLC (57) ABSTRACT

A content management section rearranges contents in an order from a content having a greater information value, preparing a content list. With respect to assignable areas of a display apparatus, a region value is compared with an information value of each content; the content may be assigned to the area when the information value exceeds the region value. The contents are associated with information values and the areas are associated with region values; thus, the content can be assigned to the area that is more suitable. When there are several assignable areas, a target content is assigned to an area having a highest region value.

17 Claims, 6 Drawing Sheets

| X | Y | & | \| | ^ | / | + |
|---|---|---|---|---|---|---|
| 0 | 0 | 0 | 0 | 0 | 1 | 1 |
| 0 | 1 | 0 | 1 | 1 | 1 | 0 |
| 1 | 0 | 0 | 1 | 1 | 1 | 0 |
| 1 | 1 | 1 | 1 | 0 | 0 | 1 |

DISPLAY CONTROL APPARATUS

CROSS REFERENCE TO RELATED APPLICATION

This application is based on Japanese Patent Applications No. 2011-34760 filed on Feb. 21, 2011 and No. 2011-288065 filed on Dec. 28, 2011, the disclosure of which is incorporated herein by reference.

TECHNICAL FIELD

The present disclosure relates to a technology to enable a display to be recognized easily by a user when the display is made, e.g., with respect to vehicle information, in a display apparatus Prepared in a compartment of a vehicle.

BACKGROUND

[Patent document 1] JP 2009-140488 A (U.S. 2010/0117810 A)

There is presented a variety of information in a compartment of a vehicle. For example, such presented information includes information indicating a state of the vehicle such as a vehicle speed, an engine rotation frequency, a shift position, a fuel amount, and a water temperature. In addition, for example, the presented information includes a map for navigation, a setup information of an air-conditioner, and audio information. In recent years, the presented information further includes a night view for driving assistance, or information on a portable terminal brought into the vehicle.

The presented information becomes displayed in various kinds of display apparatuses mounted in the vehicle. The various kinds of display apparatuses include a head-up display, and a liquid crystal display for displaying a map for navigation. In addition, a meter panel comes to use a liquid crystal display; thus, it can present various information as one kind of the display apparatus.

As explained above, the number of the presented information items (hereinafter, also referred to as a "content") increases; the vehicle has several display units as a display apparatus. Thus, it becomes important which content should be displayed, which one of the several display units should display the content, or which region (hereinafter referred to as "area") within each display unit should display the content.

There is conventionally known a technology which assigns several display window data generated by a portable terminal to a single display screen (for example, refer to Patent document 1). This technology assigns priority orders to each of the several display window data and each of several display areas, respectively; thus, the display window data and display area are determined based on the priority orders.

In the technology of the above Patent document 1, even a content with a low importance may be displayed in an area with a high priority order when the content has the relatively highest priority order among the contents serving as display targets. As the result, the content may be displayed in the area unsuitable for the content with the low priority order.

SUMMARY

It is an object of the present disclosure is to provide a display control apparatus to assign a content with a suitable area, enabling a user to easily understand a display of information.

To achieve the above object, according to a first example of an aspect of the disclosure, a display control apparatus is provided as follows. The display control apparatus assigns contents, which are defined as display targets, to a plurality of areas and display the assigned contents. The plurality of areas are assigned as a display region on a screen of a display apparatus that is mounted to a vehicle.

The display control apparatus includes a content management section, an area management section, and a content assignment control section. The content management section manages the contents in association with information values which indicate informational importance degrees. For example, a content having a higher urgency has a relatively higher information value.

The area management section manages the areas in association with region values which indicate positional importance degrees. For example, an area such as a head-up display, where little movement occurs in respect of a sight line during running, has a relatively greater region value.

The content assignment control section assigns the contents managed in the content management section to the areas managed in the area management section. Herein, the content assignment control section compares an information value with a region value, and determines that the content is enabled to be assigned to the area when the information value exceeds the region value. The information value and the region value can be expressed as numerical values, for example; the numerical values may be used for the comparison. Further, the information value and the region value can be expressed as stepwise ranks; the ranks may be used for the comparison.

That is, an information value is associated with a content; a region value is associated with an area; thereby, the content can be assigned to the area that is more suitable for the content. This is different from the case where only the priority order is used like in a conventional technology. The content is assigned to the area in consideration of the balance between the information value and the region value. Without being assigned to an unsuitable area, the content can be arranged in a suitable area for the content. Thus, the information display can be made so as to be easily understood by a user.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
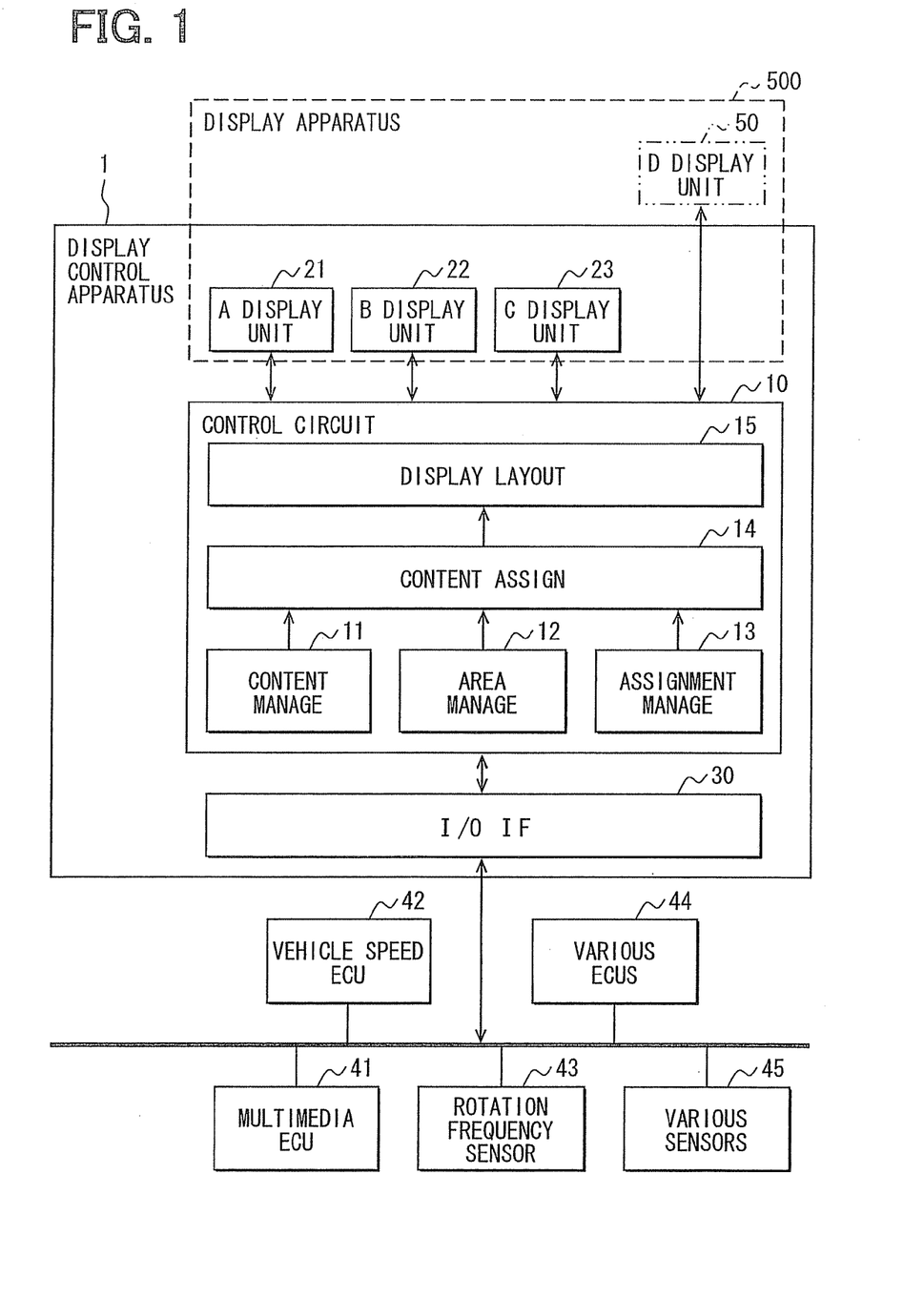
FIG. 1 is a block diagram illustrating an overall configuration of a display control apparatus.

The following describes an embodiment of the present disclosure with reference to drawings. FIG. 1 is a block diagram illustrating an overall configuration of a display control apparatus 1 according to the present embodiment. The display control apparatus 1 mainly includes a control circuit 10. The control circuit 10 is connected with three display units 21, 22, and 23 and an input and output IF 30. It is noted that in order to distinguish the three display units 21 to 23, the following uses "A display unit 21", "B display unit 22", and "C display unit 23", as needed. The three display units 21, 22, and 23 are collectively referred to as a display apparatus 500.

The three A to C display units 21 to 23 are embodied, for instance, a head-up display, a meter panel, a liquid crystal display that displays a map for navigation, respectively. There is no need to be limited thereto.

The input and output IF 30 is used for connecting with a network (for example, CAN) in a vehicle. The display control apparatus 1 is connected to a multimedia ECU 41, a vehicle speed ECU 42, an engine rotation frequency sensor 43, various ECUs 44, and various sensors 45 via the input and output IF 30. The various ECUs 44 include a navigation ECU, for example. In addition, the various sensors 45 include an external temperature sensor which detects an external temperature external to a compartment of the vehicle, and a water temperature sensor which detects a temperature of an engine cooling water.

Under such a configuration, the display control apparatus 1 can acquire various kinds of contents via the network. The contents include the following: "audio information" acquired from the multimedia ECU 41; "vehicle speed" acquired from the vehicle speed ECU 42; "engine rotation frequency" acquired from the engine rotation frequency sensor 43; "map" acquired from the navigation ECU contained in the various ECUs 44; and "external temperature" acquired from the external temperature sensor contained in the various sensors 45.

Figure 2A:
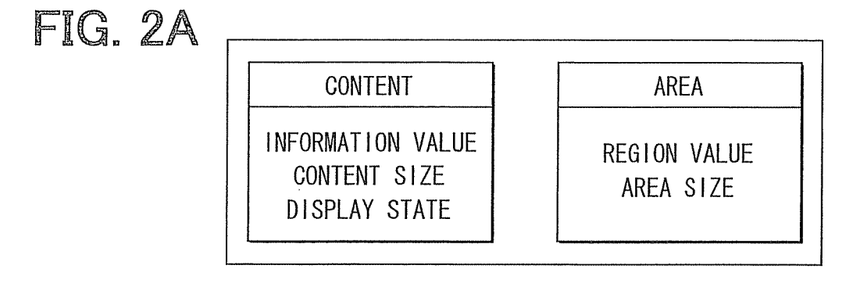
FIG. 2A is a diagram for explaining attributes associated with a content and an area.

The control circuit 10 includes a content management section 11, an area management section 12, an assignment management section 13, a content assignment control section 14, and a display layout control section 15. The content management section 11 has a function for managing the various contents mentioned above, and manages similarly other contents belonging to different categories. The content management section 11 manages, as indicated in FIG. 2A, three attributes of "information value", "content size", and "display state" in association with each other, with respect to a content.

It is noted that the information value indicates an importance degree of a content. A content having a higher urgency such as "warning information" has generally a higher information value. Next, a content relating to a travel state such as "vehicle speed", "engine rotation frequency" has a next higher information value. A content such as "map" for navigation and "audio information" has a relatively lower information value.

In addition, the content size signifies a size of an area necessary for displaying the content, and, is expressed, e.g., using the numbers of pixels in a longitudinal direction and a lateral direction. Further, the display state is information to indicate whether to be defined as a display target or not; the display state is assigned with either "active state" indicating that the content is defined as a display target or "inactive state" indicating that the content is not defined as a display target.

In detail, the "active state" and "inactive state" may be switched therebetween depending on a vehicle state or user's manipulation. For example, when the shift range is R (Rearward), the content of a "back monitor" is assigned with the "active state". When the shift range is other than R, the content of the "back monitor" is assigned with the "inactive state." Further, for instance, when the user turns an audio switch into an ON state, the content of "audio information" is assigned with the "active state". When the user turns the audio switch into an OFF state, the content of "audio information" is assigned with the "inactive state".

The area management section 12 has a function for managing several areas serving as display regions. The areas are assigned to screens of three A to C display units 21 to 23. The area management section 12 manages evenly the areas of three A to C display units 21 to 23. That is, the areas of A display unit 21 and the areas of B display unit 22 are managed without distinction between an area in A display unit 21 and an area in B display unit 22. In contrast, the area management section 12 manages each area in association with two attributes of "region value" and "area size", as indicated in FIG. 2A.

It is noted that the region value indicates an importance degree of an area. An area having a better visibility is generally assigned with a higher region value. For example, an area of the head-up display using a windshield is assigned with a higher region value.

Figure 3A:
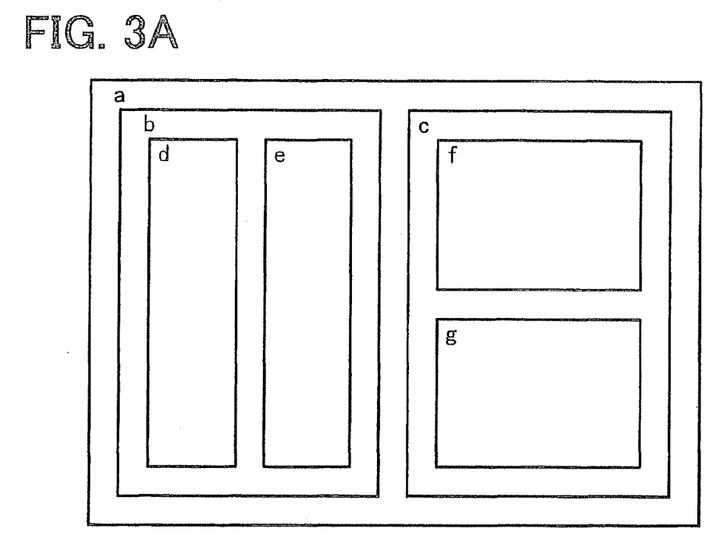
FIGS. 3A to 3C are diagrams for explaining a hierarchy data structure of areas in an area management section.
Figure 3B:
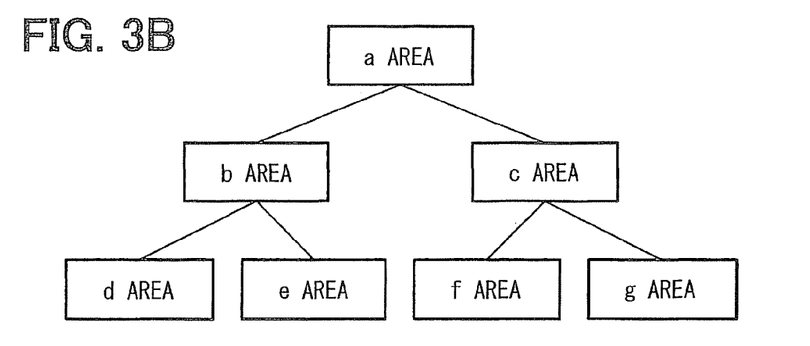
Figure 3C:
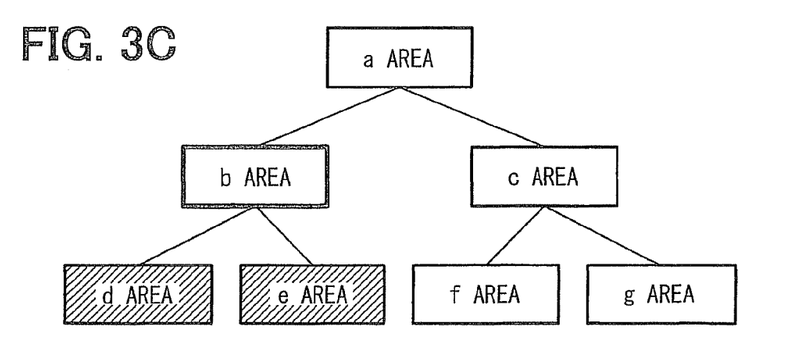

In addition, the area size is a magnitude of an area and is expressed using the numbers of pixels in the longitudinal direction and the lateral direction, similar to the content size. In addition, the area management section 12 manages the areas included in the display apparatus 500 based on a hierarchy data structure. That is, the areas included in A to C display units 21 to 23 are managed under the hierarchy data structure. FIG. 3A to FIG. 3C. illustrate examples of the areas of A display unit 21, for instance.

With reference to FIG. 3A, the display region of A display unit 21 is defined as "a" area which uses the whole screen; "b" area and "c" area which are provided by dividing "a" area into two right and left segments of the screen; furthermore, "d" area and "e" area which are provided by dividing "b" area into two right and left sub-segments; and "f" area and "g" area which are provided by dividing "c" area into two upper and lower sub-segments.

In this case, as indicated in FIG. 3B, "a" area is managed as an area that is the highest layered area in the hierarchy data structure. Then, "b" area and "c" area are managed as the second highest layered areas just under "a" area. Further, "d" area and "e" area, and "f" area and "g" area are managed as the third highest layered areas under "b" area and "c" area, respectively.

For instance, when the content is assigned to "b" area, it is determined that "d" area and "e" area that are lower layered areas below "b" area cannot be used, as indicated in FIG. 3C. It is noted that a content may be assigned only to "b" area out of "b" area and "c" area just under "a" area (the areas of "c", "f", and "g" are not used). In this case, the content just needs to be displayed in "a" area; a centering may be applied to the content to straddle the areas of "b" and "c".

Thus, the present embodiment provides the content management section 11 and the area management section 12; thereby, the content assignment control section 14 compares the information value of a content with the region value of an area. A content can be assigned to an area only when the information value of the content is greater than the region value of the area, as a general rule. Hereinafter, the information value and the region value may be collectively referred to as "value"; the content size and the area size may be collectively referred to as "size."

The content assignment control section 14 executes assignment of a content to an area in consideration of the "size" as well as "value" of the content and area. The display layout control section 15 display a content in an area when the content is assigned to the area.

Incidentally, the process which assigns the content to the area based on the attributes of the content and area may be referred to as a "dynamic assignment" process. In contrast, other than such a content, some contents are fixedly assigned to predetermined areas. This may be referred to as a "static assignment." The predetermined association relation between the content and area is managed by the assignment management section 13.

Figure 2B:
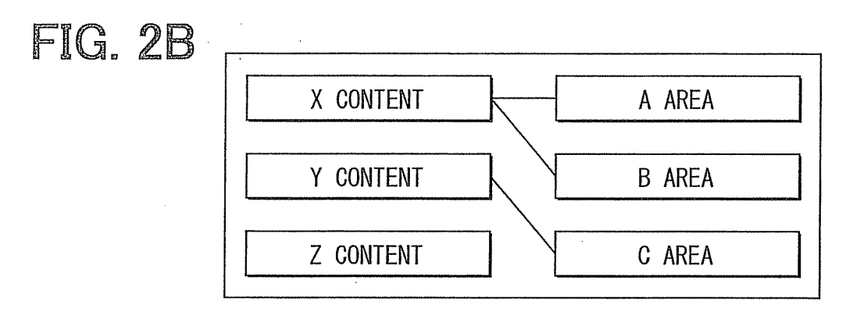
FIG. 2B is a diagram for explaining an association relation of contents and areas.

It is noted that with reference to FIG. 2B, X CONTENT is assigned to A AREA or B AREA; Y CONTENT is assigned to C AREA. These cases are referred to as the "static assignment." Further, with reference to FIG. 2C, the assignment of Z CONTENT is referred to as the "dynamic assignment."

The assignment management section 13 has an association relation between X CONTENT and A AREA and B AREA, as indicated in FIG. 2B. Herein, X CONTENT is assigned to A AREA or B AREA. In addition, the assignment management section 13 has an association relation between Y CONTENT and C AREA, for instance. Herein, Y CONTENT is assigned to C AREA.

Figure 4:
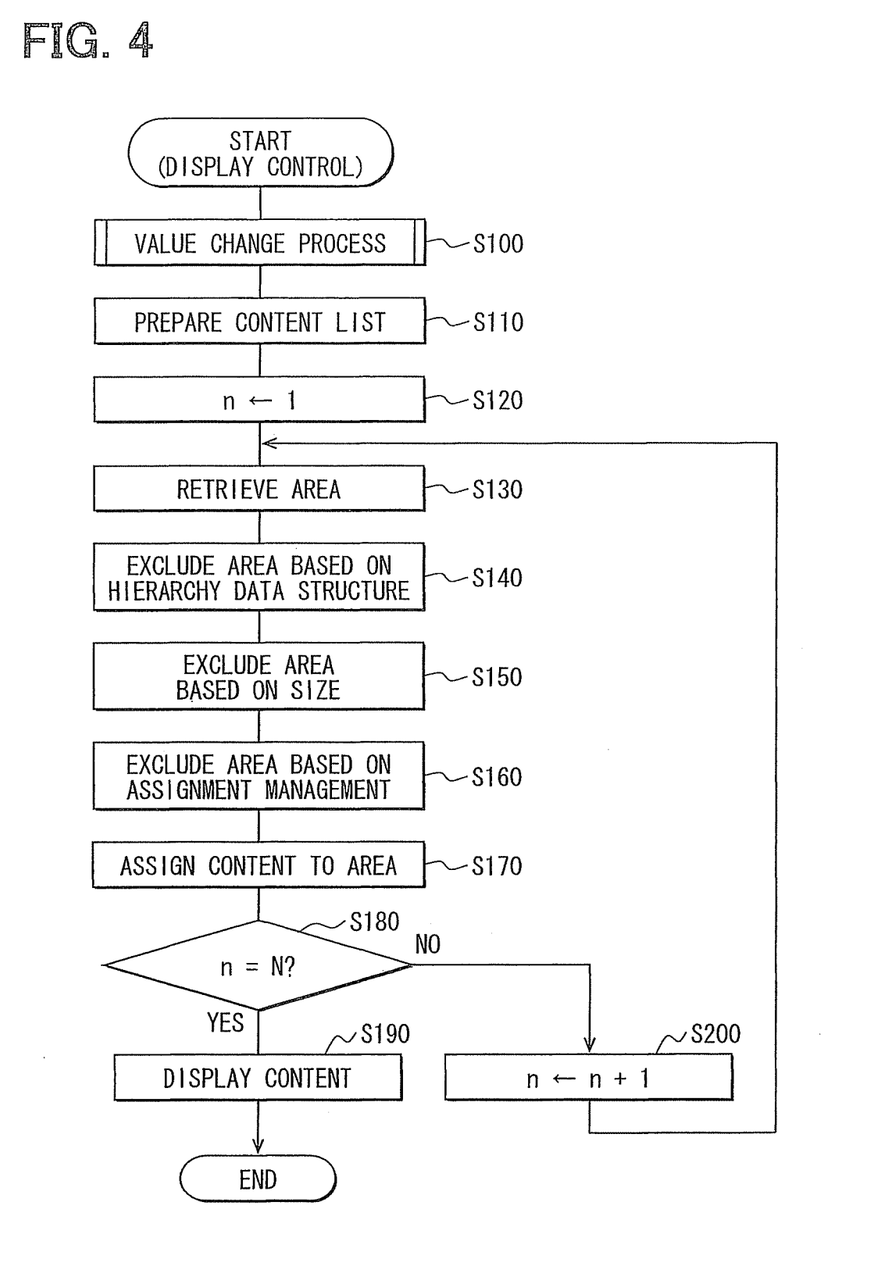
FIG. 4 is a flowchart illustrating a display control process.

The following will explain a process for display control more specifically. FIG. 4 is a flowchart illustrating a display control process. This display control process is repeatedly executed while the ignition key is turned in an ON state.

It is further noted that a flowchart or the processing of the flowchart in the present application includes sections (also referred to as steps), which are represented, for instance, as S100. Further, each section can be divided into several sub-sections while several sections can be combined into a single section. Furthermore, each of thus configured sections can be referred to as a device, module, or means and achieved not only (i) as a software section in combination with a hardware device (e.g., computer), but also (ii) as a hardware section, including or not including a function of a related apparatus. Further, the hardware section may be inside of a microcomputer. Furthermore, the software section may be included in a software program, which may be contained in a non-transitory computer-readable storage media as a program product.

First, at S100, a value change process is executed. This process changes the information value of a content and the region value of an area based on a vehicle state of the vehicle (a travel state of either being during running or being during stopping, in the present embodiment). It is noted that the present embodiment executes the value change process; however, this process is not indispensable. The value change process may be omitted as another embodiment. In addition, the value change process may be executed only when a predetermined condition is satisfied.

At S110, a content list is prepared. This processing extracts contents having attributes of the display states being "active state", and rearranges the extracted contents from the greatest in the descending order in respect of the information value.

It is noted that this processing may be realized as a function of the content management section 11. Herein, the contents whose total number is N are rearranged.

At S120, a variable n which indicates a content is initialized as "1". Each time the variable n is incremented, the processing executes a transition of the first content→the second content→the third content→ . . .

At S130, an area is retrieved. This processing retrieves all the areas where any content is still not assigned. At S140, an area is excluded based on the hierarchy data structure. This processing excludes an area, which is a non-content area where no content is assigned but the non-content area which has in the hierarchy data structure an upper area where a content is already assigned. For example, with reference to FIG. 3C, when the content is assigned to "b" area, "d" area and "e" area are excluded.

At S150, an area is excluded based on the content size and area size. This processing excludes an area having an area size smaller than the content size of the content to which the area is to be assigned.

Figure 2C:
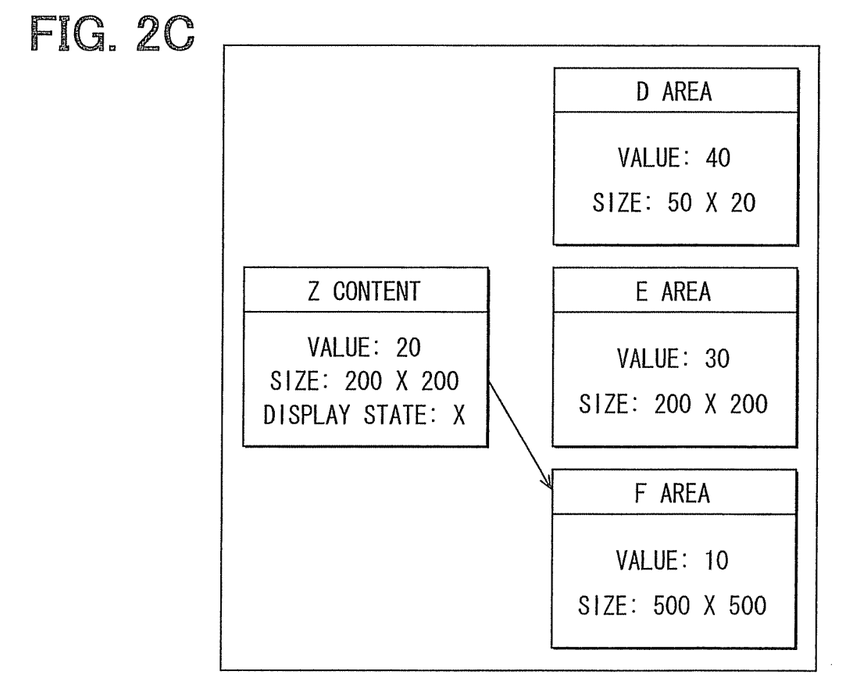
FIG. 2C is a diagram for explaining a content assignment based on an attribute.

For instance, with reference to FIG. 2C, Z CONTENT has a content size of "200×200". When assigning Z CONTENT, D AREA having an area size of "50×20" is excluded.

At S160, an area is excluded based on the assignment management. In detail, based on the association relation stored in the assignment management section 13, an area does not have an association relation with the content is excluded.

At S170, the content is assigned to an area. This processing deals with areas that remain as target areas up to S170. With respect to each of those target areas, an area value of each target area is compared with the content value of the content. That is, areas having region values less than the content value of a content are extracted; among the extracted areas, an area having the greatest region value is then selected and assigned with the content. For instance, refer to FIG. 2C. The information value of Z CONTENT is "20"; thus, Z CONTENT is assigned to F AREA having the region value of "10" which is less than the information value of "20."

At S180, it is determined whether the variable n is equal to the contents number N. This processing determines whether all the contents were processed. When n is equal to N (n=N) (S180: YES), the processing advances to S190. In contrast, when n is not equal to N (n≠N) (S180: NO), i.e., while there is still existing a content that was not processed, the variable n is incremented at S200. The processing is repeated from at S130.

It is noted that the processing of S120 to S180 may be realized as a function of the content assignment control section 14. At S190, the content is displayed. This processing displays the content on the assigned area; it may be realized as a function of the display layout control section 15.

Figure 5:
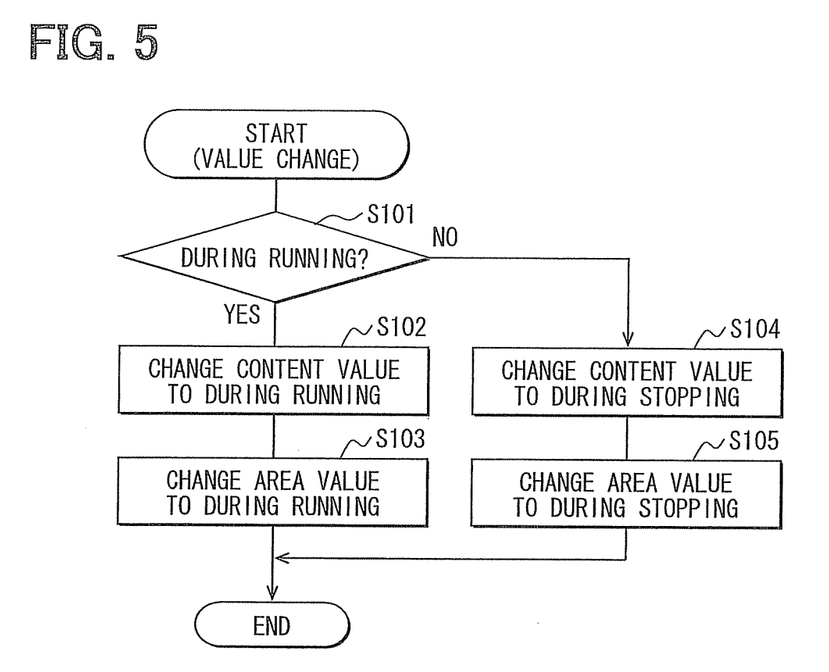
FIG. 5 is a flowchart illustrating a value change process.

The following will explain a value change process at S100 in FIG. 4. FIG. 5 is a flowchart illustrating a value change process. At S101, first, it is determined whether the vehicle is during running. This determination is made based on the "vehicle speed" transmitted from the vehicle speed ECU 42, for instance. When it is determined that the vehicle is during running (S101: YES), the information value of the content is changed into information value during running at S102. Further, the region value is changed into the region value during running at S103. The value change process is then ended. In contrast, when it is determined that the vehicle is not during running (S101: NO), i.e., the vehicle is during stopping, the information value of the content is changed into information value during stopping at S104. Further, the region value is changed into the region value during stopping at S105. The value change process is then ended.

The information value during running/during stopping relative to a content, and the region value during running/during stopping relative to an area are supposed to be predetermined. For example, the importance degree with respect to a content acquired from the multimedia ECU 41 may be decreased during running as compared with during stopping. Such a content is assigned with an information value such that the information value during running is smaller than that during stopping. In addition, the importance degree is supposed to be increased with respect to an area in which the movement of a sight line is extremely decreased during running. Therefore, such an area is assigned with the region value such that the region value during running is greater than that during stopping.

The following will explain an effect which the display control apparatus 1 of the present embodiment demonstrates. In the present embodiment, with respect to an assignable area, its region value is compared with the information value of a content; the content may be assigned to the area when the information value exceeds the region value (S170 in FIG. 4). That is, in the present embodiment, the information value is associated with the content; the region value is associated with the area. The content can be thus assigned to the area that is more suitable for the content. This is different from the case where only the priority order is used like in a conventional technology. The content is assigned to the area in consideration of the balance between the information value and the region value. Thus, the information display can be made so as to be easily understood by a user.

When there are several assignable areas, the target content is assigned to the area which has the greatest region value (S170 in FIG. 4). Thereby, the content can be assigned to the assignable areas in an order from an assignable area which has a greater region value. This enhances an effect that the information display can be made so as to be easily understood by a user.

Under such a presumption, in the present embodiment, the content management section 11 rearranges sequentially contents from the content having a greater information value, preparing the content list (S110 in FIG. 4). Thereby, a content having a greater information value can be preferentially assigned to an area having a greater region value, sequentially. This enhances an effect that a content can be assigned to an area that is suitable for the content.

Further, in the present embodiment, a content size is compared with an area size, thereby excluding an area having an area size smaller than the content size of the content of the assignment target (S150 in FIG. 4). This configuration can eliminate the necessity of the display by scrolling the content, or the necessity of the display by reducing the size of the content. Thus, the information display can be made so as to be easily understood by a user.

Further, in the present embodiment, the area management section 12 has a hierarchy data structure of the areas (refer to FIG. 3B). When assigning a content, an area that is layered lower than the area that has been assigned with the content is excluded based on the hierarchy data structure (S140 in FIG. 4). Thereby, the child-parent relation of the areas can be determined easily; the assignable area can be determined promptly.

In addition, in the present embodiment, the values of a content and an area are changed based on the travel state of the vehicle (S100 in FIG. 4). In specific, when the vehicle is during running (S101: YES in FIG. 5), the values are changed into the information value during running and the region value during running, respectively (S102, S103). In contrast, when the vehicle is during stopping (S101: NO in FIG. 5), the values are changed into the information value during stopping and the region value during stopping, respectively (S104, S105). The content can be thus assigned to an area that is more suitable for the content.

Further, in the present embodiment, a content is associated with "display state" serving as an attribute (refer to FIG. 2A). Only a content whose display state is "active information" can be defined as a display target (target for assignment). This configuration can easily manage whether a content is defined as a display target.

Further, in the present embodiment; the assignment management section 13 manages previously an association relation between some of contents and areas associated with the some of contents (refer to FIG. 2B). The assignment of a content is executed by giving priority to this association relation. The content can be thus assigned to an area that is more suitable for the content. The property in the design can be thereby secured. In addition, an area which a user desires can be assigned with a content which the user desires.

Further, in the present embodiment, the various contents are acquired via the network in the vehicle (refer to FIG. 1). Herein, the content management section 11 manages "information value", "content size", and "display state" in association with each of the various contents. This configuration can assign contents to areas in an identical algorithm regardless of kinds of the contents.

Similarly, in the present embodiment, "region value" and "area size" are managed in association with each of several areas in the display apparatus 500 (i.e., A to C display units 21 to 23). Thereby, an area to which a content should be assigned can be determined under an identical algorithm without need of distinguishing among A to C display units 21 to 23.

In addition, the control circuit 10 which executes S100 and S110 in FIG. 4 may function as a "content management section." The control circuit 10 which executes S120 to S180 may function as a "content assignment control section."

The present disclosure is not limited to the embodiment mentioned above at all, and can be executed in the various manners within a scope of a subject matter. (a) In the above embodiment, each content whose display state indicates "active state" is extracted; the extracted contents are rearranges in a descending order from one having a greater information value, preparing a content list (S110 in FIG. 4).

In contrast, the assignment management section 13 may store an indispensable exclusion constraint expression relative to contents. A content list may be prepared based on the indispensable exclusion constraint expression relative to contents. The indispensable exclusion constraint expression relative to contents is information, which stipulates an indispensable display or exclusive display of the contents, using a predetermined constraint expression.

Figure 6A:
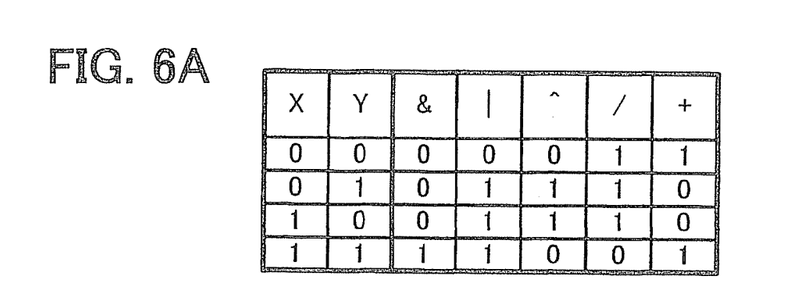
FIGS. 6A to 6D are diagrams for explaining a process of an indispensable exclusion constraint expression that is stipulated using predetermined operators.

For example, five operators, "&", "|", "^", "/", and "+" indicated in FIG. 6A will be defined. Herein, X&Y signifies displaying of both X and Y.

Further, X|Y signifies displaying of only X, displaying of only Y, or displaying of both X and Y. Further, X^Y signifies displaying of only X or displaying of only Y.

Further, X/Y signifies displaying of only X, displaying of only Y, or displaying of neither X nor Y. Further, X+Y signifies displaying of both X and Y, or displaying of neither X nor Y.

It is noted that X/Y is denial of X&Y, and X+Y is denial of X^Y. In detail, the indispensable exclusion constraint expression is processed after the processing at S110 in FIG. 4. The content whose attribute is "inactive state" is also contained in the indispensable exclusion constraint expression.

Figure 6B:
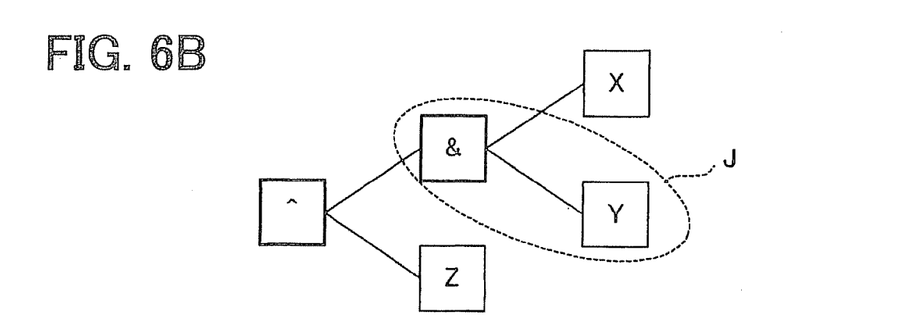
Figure 6C:
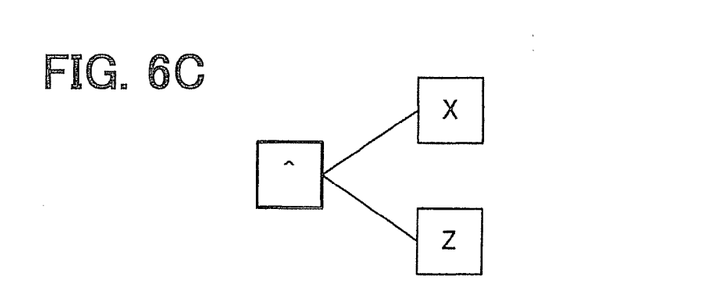

As illustrated in FIG. 6B, a syntax tree is prepared from the indispensable exclusion constraint expression. The indispensable exclusion constraint expression of "(X&Y)^Z" is indicated as a syntax tree in FIG. 6B. Herein, the contents of X and Z are supposed to be in "active state", and the content of Y is supposed to be in "inactive state". In this case, the content of Y is deleted from the syntax tree; simultaneously, the operator "&" layered higher than Y is deleted from the syntax tree (refer to sign J). Thereby, the syntax tree is changed as illustrated in FIG. 6C; the indispensable exclusion constraint expression becomes "X^Z". Thus, the technique of deleting the content in "inactive state" and the operator layered higher than the deleted content is applied when the higher layered operator is "&", "|", or "^".

Figure 6D:
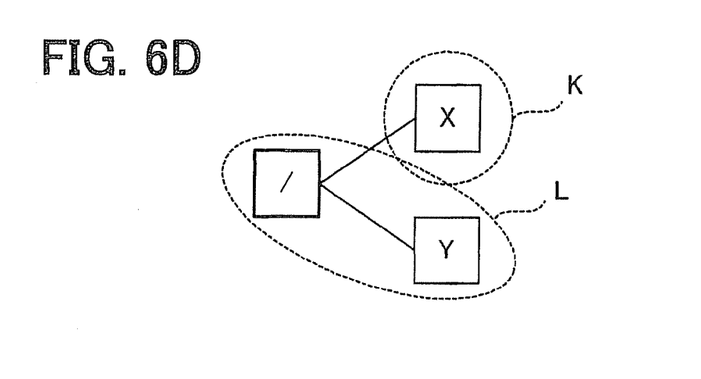

In contrast, when the higher layered operator is "/" as indicated in FIG. 6D, the content of Y in "inactive state" and the operator "/" layered higher than the content of Y are deleted (refer to sign L); simultaneously, the content of X layered lower than the deleted operator "/" is also deleted (refer to sign K). The same is applied when the operator is "+".

It is noted that, in the case of processing an indispensable exclusion constraint expression, the use of an operator which indicates denial does not lead to obtaining an expected result. The operator which indicates denial is thus not used. In addition, the indispensable exclusion constraint expression may be referred to as content display information. The assignment management section 13 may be referred to as a content display information storage section.

Under such a configuration, contents may be assigned to areas in considering the content indispensable exclusion relation as well. Thus, a more suitable information display can be executed. In addition, an indispensable exclusion constraint expression can be similarly stipulated with respect to an indispensable exclusion relation of areas; it can be processed similarly. In this case, the indispensable exclusion constraint expression which stipulates the indispensable exclusion relation of areas may be referred to as "area usage information." In addition, under the configuration where the indispensable exclusion constraint expression is stored in the assignment management section 13, the assignment management section 13 may be referred to as an "area usage information storage section."

(b) As explained above, the contents and the areas are managed only using the attributes; thus, the assignment of contents to areas can be made using an identical algorithm, regardless of the kinds of the contents, or regardless of the distinction of the display units 21 to 23 of the display apparatus 500.

Therefore, in the display control apparatus 1 of the above embodiment, for example, when any one of A to C display units 21 breaks down, the area management section 12 updates the management information, thereby enabling the assignment of the contents to the areas without need of changing the algorithm.

Likewise, as indicated in FIG. 1, D display unit 50 may be additionally connected as a part of the display apparatus 500 in an easy manner. In this case, the area management section 12 only needs to update the management information according to the addition of D display unit 50. Here, D display unit 50 is exemplified as a cellular phone such as a smart phone, and an information terminal such as a PDA (Personal Digital Assistance). In this case, it is possible to acquire information about areas from D display unit 50 itself. In addition, it is also considered that the content management section 11 acquires contents from D display unit 50.

(c) In the above embodiment, both the information value and the region value are changed in the value change process (S100 in FIG. 4). Alternatively, while one of the information value and the region value is unchanged, only the other may be changed.

In addition, in the above embodiment, the information value and the region value are changed based on whether the travel state of the vehicle is during running or during stopping. Further, the values may be changed depending on a more specific travel state such as during running at a low speed or during running at a high speed. In addition, for example, a system which can calculate a driver's load may be additionally used; thereby, the values may be changed in consideration of the driver's load.

(d) In the above embodiment, the content size and the area size are compared with each other to extract an area in which the content can be accommodated. For example, the reduction display or scroll display of a content may be additionally used; thereby, the content may be assigned to the area having an area size smaller than the content size.

(e) In the above embodiment, a content having a higher information value is preferentially assigned to, of areas having region values lower than the information value of that content, an area having the highest region value (S170 in FIG. 4). Alternatively, the above content may be assigned to the area having the second highest region value or an area having the subsequently highest region value. Such a configuration can maintain an area having a high region value unoccupied. When a content having a high urgency degree is moved to the "active state", the content can be displayed by using the area having the high region value.

[Optional Aspects]

While the aspect of the disclosure described herein is already recited in the preceding, further optional aspects thereto may be set out as follows.

As a second example of an optional aspect, in cases that there are several assignable areas, the content assignment control section may assign the content to the areas in an order from an area having a highest region value among the areas, which are determined to be assigned with the content. Thereby, the area which has a greater region value can be preferentially assigned with the content. This enhances an effect that the information display can be made so as to be easily understood by a user.

Further, as a third example of an optional aspect, the content assignment control section may assign an area with contents in an order from a content having a higher information value. Thereby, the content which has a greater information value can be preferentially assigned to an area having a greater region value. This enhances an effect that a content can be assigned to an area that is suitable for the content.

When the region necessary for displaying a content becomes greater as compare with an area, a display by scrolling the content, or a display by reducing the size of the content becomes necessary.

As a fourth example of an optional aspect, the content management section may manage a content in association with a content size which is a size necessary for information display; the area management section may manage an area in association with an area size which is a size of the area; the content assignment control section may compare the area size with the content size, and determine that the content is enabled to be assigned to the area when the content is contained in the area.

This configuration can eliminate the display by scrolling the content, or the display by reducing the content. Thus, the information display can be made so as to be easily understood by a user.

Incidentally, when the number of contents increases, it is necessary to divide an area for display. To that end, as a fifth example of an optional aspect, the area management section may be enabled to manage a predetermined area as a single area, and, simultaneously, manage a plurality of areas that are formed by dividing the predetermined area. the area management section may further have a hierarchy data structure where the plurality of areas is located to be layered lower than the single area. That is, an area is divided previously; the area before the division is defined as a parent and the areas formed by the division are managed as children. In this case, the content assignment control portion determines the area which is enabled to be assign with the content based on the hierarchy data structure. Thereby, the child-parent relation of the areas can be determined easily; the assignable area can be determined promptly.

Further, an information value of a content may be changed according to a state of a vehicle. To that end, as a sixth example of an optional aspect, the content management section may be enabled to change the information value based on a state of the vehicle. For example, the information value associated with a content is changed between during stopping and during running. The content can be thus assigned to an area that is more suitable for the content.

Likewise, a region value of an area may be changed according to a state of a vehicle. To that end; as a seventh example of an optional aspect, the area management section may be enabled to change the region value based on a state of the vehicle. The content can be thus assigned to an area that is more suitable for the content.

Under this configuration that can change an information value or region value, the information value and region value can be changed extremely. This enables a content itself to be non-display, i.e., in the state where the content is not assigned to any area. It is noted that further achieving display/non-display of a content may result in complicated processing.

To that end, as an eighth example of an optional aspect, the content management section may manage whether each content is defined as a display target. For example, each content may be associated with a flag indicating a display state or non-display state. Such a flag can be set or reset depending on a state of the vehicle, for instance. In addition, it may be set or reset depending on a user's manipulation. Further, it may be set or reset depending on whether a display request is issued from a content. This configuration can easily manage whether a content is defined as a display target.

Incidentally, there may be a certain content that needs an indispensable display or a certain content that needs an exclusion display. For example, the "vehicle speed" needs inevitably at least one of an analog display (meter display) or a digital display (numerical value display).

To that end, as a ninth example of an optional aspect, a content display information storage section may be included to store content display information which stipulates an indispensable exclusion relation of the content. In this case, the content assignment control section assigns the content to the area based on the content display information stored in the content display information storage section. Under such a cofiguration, contents may be assigned to areas in considerating the content indispensable exclusion relation as well. Thus, a more suitable information display can be executed.

In specific, as a tenth example of an optional aspect, the content display information may be an indispensable exclusion constraint expression that indicates a content indispensable exclusion relation indicated by predetermined operators. In this case, the content assignment control section assigns the content to the area so as to satisfy the indispensable exclusion constraint expression. Under such a configuration, contents may be assigned to areas in considering the content indispensable exclusion relation as well.

In addition, like the contents, there may be a state where it is not desirable for a certain area to be used simultaneously with a different area. To that end, as an eleventh example of an optional aspect, an area usage information storage section may be included to store area usage information which stipulates an indispensable exclusion relation of areas. In this case, the content assignment control section may assign the content to the area based on the area usage information stored in the area usage information storage section. Thereby, a content may be assigned to an area in considering the indispensable exclusion relation among areas, as well. Thus, a more suitable information display can be executed.

In specific, as a twelfth example of an optional aspect, the area usage information may be an indispensable exclusion constraint expression that indicates an area indispensable exclusion relation indicated by predetermined operators. In this case, the content assignment control section assigns the content to the area so as to satisfy the indispensable exclusion constraint expression. Thereby, a content may be assigned to an area in considering the indispensable exclusion relation among areas, as well.

Incidentally, a content may be assigned in a predetermined manner to a suitable area depending on the kind of the content. To that end, as a thirteenth example of an optional aspect, the assignment management section may manage assignment information of the content to the area; the content assignment control section may assign the content to the area by preferentially using the assignment information of the assignment management section. The assignment information may be previously designated; it may be designated by a user as needed. The content can be thus assigned to an area that is more suitable for the content. The property in the design can be thereby secured. In addition, an area which a user desires can be assigned with a content which the user desires.

As a fourteenth example of an optional aspect, the content management section may acquire the content using a network in the vehicle. Further, as a fifteenth example of an optional aspect, the content may be acquired from an external instrument that is newly connected. Such an external instrument may include a cellular phone such as a smart phone, and an information terminal such as a PDA (Personal Digital Assistance). That is, if a content is managed in association with an information value, the content can be assigned to an area in an identical algorithm regardless of the kind of the content.

In addition, similarly, if an area is managed in association with a region value, a content can be assigned to an area in an identical algorithm regardless of the kind of the display apparatus. To that end, as a sixteenth example of an optional aspect, the display apparatus may include several display units; the area management section may manage the areas for the several display units. In this case, as a seventeenth example of an optional aspect, the area management section may update an area to manage, when a part of the plurality of display units is detached or attached. For instance, if the display unit is configured to have area information, updating of an area to manage can be made using the information from the display unit that is detached or attached.

Although the present disclosure is described based on the embodiment, it is understood that the present disclosure does not need to be limited to the embodiment or its configuration. The present disclosure also includes various modification examples and modifications within a scope of an equivalent. In addition, various combinations or embodiments, and other combinations or embodiments which contain only a single element, more than one element, or less than it may be included within a scope or concept of the present disclosure.

What is claimed is:

1. A display control apparatus to assign contents, which are display targets, to a plurality of areas and display the assigned contents, the plurality of areas being assigned as a display region on a screen of a display apparatus that is mounted to a vehicle, the display control apparatus comprising:

a content management section to manage the contents in association with information values which indicate informational importance degrees;

an area management section to manage the areas in association with region values which indicate positional importance degrees; and a content assignment control section to assign the contents managed by the content management section to the areas managed by the area management section, the content assignment control section being further configured to compare an information value of a content with a region value of an area, and determine that the content is enabled to be assigned to the area when the information value of the content exceeds the region value of the area.

2. The display control apparatus according to claim 1, wherein the content assignment control section assigns the content to areas, which the content is enabled to be assigned to, in an order from an area having a highest region value.

3. The display control apparatus according to claim 2, wherein the content assignment control section assigns an area with contents in an order from a content having a higher information value.

4. The display control apparatus according to claim 1, wherein:

the content management section manages a content in association with a content size which is a size necessary for information display;

the area management section manages an area in association with an area size which is a size of the area; and the content assignment control section compares the area size with the content size, and determine that the content is enabled to be assigned to the area when the content is accommodated by the area.

5. The display control apparatus according to claim 1, wherein:

the area management section is enabled to manage a predetermined area as a single area, and, simultaneously, manage the predetermined area as a plurality of areas that are formed by dividing the predetermined area, the area management section having a hierarchy data structure where the plurality of areas is located to be layered lower than the single area; and the content assignment control portion determines the area, which is enabled to be assign with the content, based on the hierarchy data structure.

6. The display control apparatus according to claim 1, wherein the content management section is enabled to change the information value based on a state of the vehicle.

7. The display control apparatus according to claim 1, wherein the area management section is enabled to change the region value based on a state of the vehicle.

8. The display control apparatus according to claim 1, wherein the content management section manages whether each content is defined as a display target.

9. The display control apparatus according to claim 1, further comprising:

a content display information storage section to store content display information which stipulates a content indispensable exclusion relation, wherein the content assignment control section assigns the content to the area based on the content display information stored in the content display information storage section.

10. The display control apparatus according to claim 9, wherein:

the content display information is an indispensable exclusion constraint expression that indicates a content indispensable exclusion relation indicated by a predetermined operator; and the content assignment control section assigns the content to the area so as to satisfy the indispensable exclusion constraint expression.

11. The display control apparatus according to claim 1, further comprising:

an area usage information storage section to store area usage information which stipulates an area indispensable exclusion relation, wherein the content assignment control section assigns the content to the area based on the area usage information stored in the area usage information storage section.

12. The display control apparatus according to claim 11, wherein:

the area usage information is an indispensable exclusion constraint expression that indicates an area indispensable exclusion relation indicated by a predetermined operator; and the content assignment control section assigns the content to the area so as to satisfy the indispensable exclusion constraint expression.

13. The display control apparatus according to claim 1, further comprising:

an assignment management section to manage assignment information of the content to the area, wherein the content assignment control section assigns the content to the area by preferentially using the assignment information managed by the assignment management section.

14. The display control apparatus according to claim 1, wherein the content management section acquires the content using a network in the vehicle.

15. The display control apparatus according to claim 1, wherein the content management section is enabled to acquire the content from an external instrument that is newly connected.

16. The display control apparatus according to claim 1, wherein:

the display apparatus contains a plurality of display units; and the area management section manages the areas for the plurality of display units.

17. The display control apparatus according to claim 16, wherein the area management section updates an area to manage, when a part of the plurality of display units is detached or attached.

* * * * *